United States Patent
Watanabe

[11] 3,752,446
[45] Aug. 14, 1973

[54] APPARATUS FOR DISSOLVING POWDER IN WATER

[75] Inventor: Akira Watanabe, Numazu, Japan

[73] Assignee: Akatake Engineering Company Limited, Shizuokaken, Japan

[22] Filed: Feb. 2, 1972

[21] Appl. No.: 222,726

[30] Foreign Application Priority Data
Sept. 27, 1971 Japan.............................. 46/74608

[52] U.S. Cl............................. 259/7, 259/4, 259/60
[51] Int. Cl......... B01f 5/04, B01f 7/26, B01f 13/10
[58] Field of Search .................... 259/7, 8, 60, 151

[56] References Cited
UNITED STATES PATENTS
| | | | |
|---|---|---|---|
| 2,231,489 | 2/1941 | Anderson et al. ................. | 259/151 |
| 3,179,378 | 4/1965 | Zenz et al. ....................... | 259/151 X |
| 3,194,539 | 7/1965 | Hanne-Wiame ................. | 259/151 X |
| 3,400,915 | 9/1968 | Onishi et al............................ | 259/8 |

Primary Examiner—John Petrakes
Assistant Examiner—Philip R. Coe
Attorney—Joseph M. Fitzpatrick, John Thomas Cella et al.

[57] ABSTRACT

The apparatus for dissolving powder in water comprises a hopper containing the powder, a metering chamber communicated with the bottom of the hopper through a passage to receive powder, a rotary air pipe extending through the hopper into the metering chamber, an inner nozzle connected to the lower end of the rotary air pipe in the metering chamber to eject a stream of pressurized air, a stirrer mounted on the inner nozzle for uniformly admixing the powder with the stream of pressurized water, an outer nozzle coaxial with the inner nozzle and connected therewith through a discharge passage for ejecting a stream of air-powder mixture and a water spray mechanism for ejecting whirling water jet against the stream of air-powder mixture whereby to form a stream of mist like mixture containing air buffles and the powder in contact with water.

11 Claims, 2 Drawing Figures

APPARATUS FOR DISSOLVING POWDER IN WATER

BACKGROUND OF THE INVENTION

This invention relates to an apparatus for continuously, rapidly and uniformly dissolving a powder which is relatively difficult to dissolve in water.

A powder of a high molecular weight coagulating agent of the polyacrylic amide type utilized for the purifying treatment of industrial waste water is relatively difficult to dissolve in water. Nevertheless, it is highly desirable to continuously dissolve a predetermined quantity of the powder in water and then admix the water solution with industrial waste water.

In order to obtain aqueous solution of uniform concentration it is essential to admix a definite quantity or ratio of the powder with water. When continuously dissolving in water the definite quantity of the powder, in order to obtain aqueous solution of uniform concentration, if the water and the powder to be dissolved therein are admixed at a fixed ratio, maldistribution of the powder in water would be resulted thus resulting in nonuniform concentration. Use of an agitator, however, increases the size and cost of the installation.

It has been proposed an improved method of dissolving such powder comprising the steps of adding a small quantity of powder into water, continuously introducing the mixture into a dissolving tank of large capacity, supplying thereto a large quantity of water and stirring the content with a stirrer. However, when the powder is admixed with water in the form of laminae or columns the powder tends to aggregate thus causing maldistribution. Where the powder in difficult to dissolve, as the powder is not completely dissolved in water before the mixture is admitted into the dissolving tank, it is difficult to produce a solution of uniform concentration by merely admixing a large quantity of water with the mixture consisting of a small quantity of powder and a small quantity of water.

SUMMARY OF THE INVENTION

Accordingly it is the principal object of this invention to provide a new and improved apparatus for rapidly and uniformly dissolving in water a powder which is relatively difficult to be dissolved.

Another object of this invention is to provide a novel apparatus for dissolving in water a powder of material which is relatively difficult to dissolve in water by utilizing air and water under pressure to assure uniform dispersion and contact of the powder with water thus causing it to dissolve quickly and uniformly in water without coagulation and maldistribution.

According to an aspect of this invention, there is provided an apparatus for dissolving powder in water comprising a hopper adapted to containing the powder, a metering chamber communicated with the bottom of the hopper through a passage to receive the powder, a rotary air pipe extending through the hopper into the metering chamber, an inner nozzle connected to the lower end of the rotary air pipe in the metering chamber to eject a stream of pressurized air, a stirrer mounted on the inner nozzle for uniformly admixing the powder with the stream of pressurized air, an outer nozzle coaxial with the inner nozzle and connected therewith through a discharge passage for ejecting a stream of air-powder mixture, and a water spray mechanism for ejecting whirling water jet against the stream of air-powder mixture whereby to form a stream of mist like mixture containing air bubbles and the powder in contact with water.

DESCRIPTION OF THE PREFERRED EMBODIMENT

Figures 1, 2:
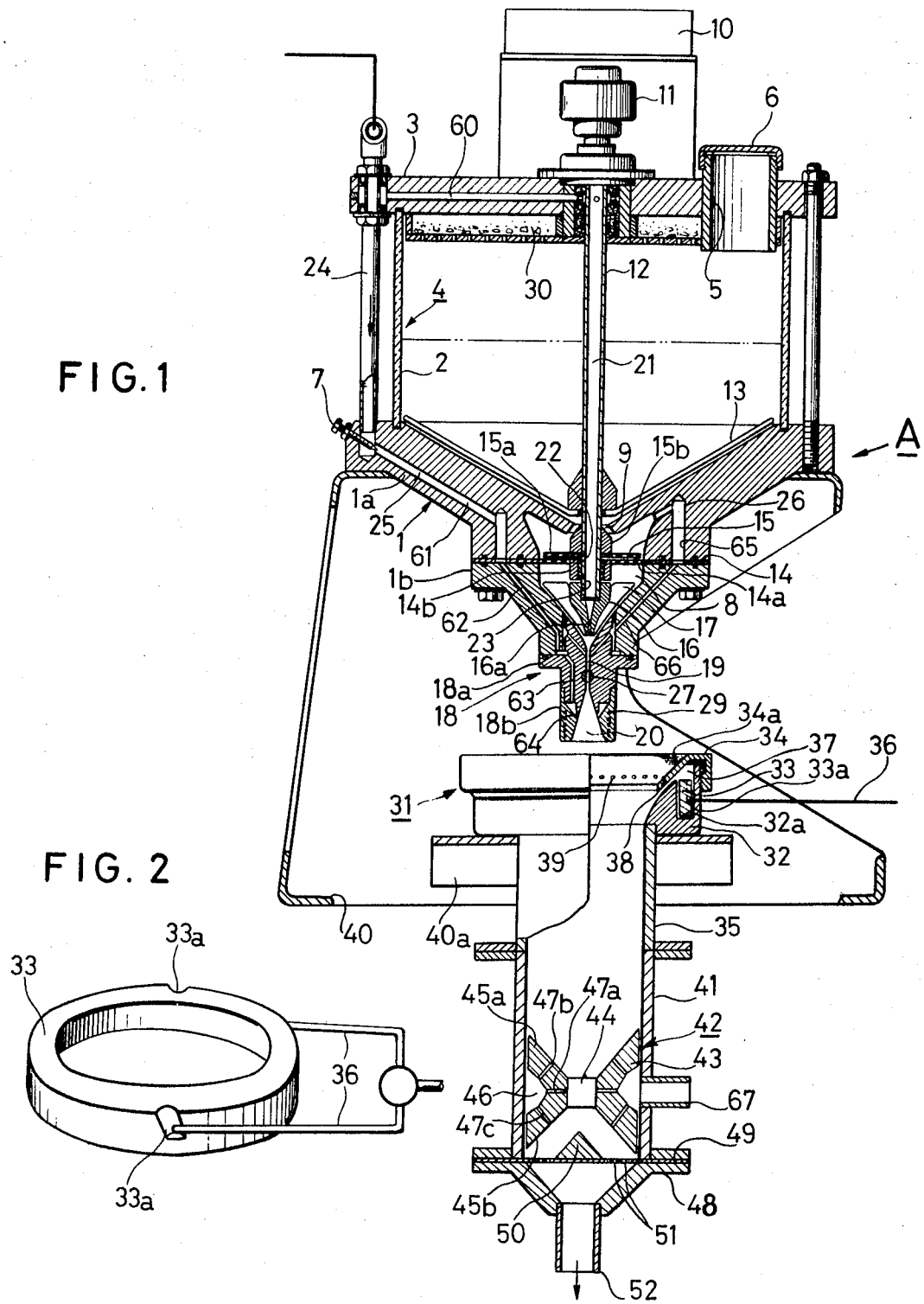
FIG. 1 shows a vertical section of a dissolving apparatus embodying the invention and FIG. 2 shows a perspective view of the whirling ring utilized in the apparatus shown in FIG. 1.

The embodiment shown in FIG. 1 comprises apparatus A for admixing a definite quantity of powder with an air stream, a water spray mechanism 31 and a stirring mechanism 42. The apparatus A comprises a hopper 4 which includes a conical bottom 1 consisting of an upper member 1a and a lower member 1b which are bolted together, a cylinder 2 mounted on the upper member 1a, and a lid 3 mounted on the cylinder 2. The lid 3 is provided with an inlet tube 5 for supplying powder, for example, a coagulating agent of the high molecular polyacrylic amide type. A dish shaped cover 6 is removably mounted on the inlet tube 5. A metering chamber 8 is formed in the lower member 1b and the central portion of the upper end of metering chamber 8 is communicated with hopper 4 through an annular passage 9. The periphery of the upper end of metering chamber 8 projects upwardly beyond annular passage 9 while the bottom of the metering chamber takes the form of an inverted cone. An electric motor 10 is mounted on lid 3 for driving a hollow shaft 12 through a induction gearing 11. The upper end of hollow shape 12 is rotatably journalled by lid 3 and the lower end extends through hopper 4 to reach the bottom portion of metering chamber 8. Hollow shaft 12 carries a stirrer fan 13 facing the inverted conical bottom of the hopper defined by the upper member 1a with a small gap therebetween and a rotary perforated disc 15 cooperating with a stationary perforated disc 14 clamped between the upper and lower members 1a and 1b at the center of the metering chamber. Stationary and rotary perforated discs 14 and 15 are provided with a plurality of axially aligned small perforations 14a and 15a respectively. Perforations 15a are slightly larger than perforations 14a. As shown, a hub 15b of rotary perforated disc 15 is fitted in annular passage 9 with a small clearance therebetween. Further, on the inner end of hollow shaft 12 is fitted an inner nozzle 16 of the inverted cone shape and received in the bottom portion of metering chamber 8 with a small clearance therebetween. A stirrer fan 17 is mounted to surround inner nozzle 16 to oppose the conical bottom surface of the metering chamber with a small clearance therebetween. To the lower end of the lower member 1a is secured the upper portion 18a of an outer nozzle 18 which forms the lower peripheral wall of the metering chamber 8. The lower portion 18b is secured to the lower end of the upper portion 18a of outer nozzle 18. The outer nozzle is formed with a powder discharge passage 19 having a small diameter and communicating with the lower end of the metering chamber and an outer nozzle opening 20 having a diameter increasing toward the bottom.

A first air passage 21 is provided to extend from a source of compressed air, not shown, through an air passage 60 in lid 3, hollow shaft 12 and an opening 16a in the inner nozzle 16 to eject a stream of compressed air from the lower end of inner nozzle 16. The compressed air supplied to the first air passage 21 also ejects through openings 22 and 23 formed between stationary and rotary perforated discs 14 and 15 and between the lower end of hub 14b acting as the bearing for hollow shaft 12 and the upper end of inner nozzle 16. Further, a second air passage 25 is provided extending from the source of the compressed air, not shown, through one of the hollow rods 24 adapted to clamp cylinder 2 between lid 3 and upper member 1a, air passages 61 and 62 in the upper and lower members 1a and 1b of bottom 1, and through an air passage 63 in the upper portion 18a of outer nozzle 18 to an annular air ejecting opening 64 for supplying the compressed air into opening 20 of the outer nozzle. A flow adjusting valve 7 shown as a screw is provided for the second air passage 25. Further, a third air passage 26 is provided extending from the outer periphery of the upper portion of the metering chamber 8, air passages 65 and 66 in the upper and lower members 1a and 1b of the bottom 1, and through a passage in the upper portion 18a of outer nozzle 18 to the powder discharge chamber 19 formed therein. A valve 27 is provided between the opening of the third air passage 26 of the air discharge passage 19 and opening 20 in the lower portion 18a. The outer nozzle 18 is provided with an embedded electric heater 29. A container 30 for a desiccating agent is mounted on the inner side of lid 3 to dry the powder contained in hopper 4.

The water spray mechanism 31 comprises an annular lower member 32 supported by a supporting member 40a of a support 40 depending from bottom 1 and a water whirling ring 33 fitted in a vertical groove 32a formed on the upper surface of member 32. A plurality of equidistance inclined grooves 33a are formed on the outer surface of water whirling ring 33. A tube 35 is connected to the lower side of lower member 32 and a feed water pipe 36 shown as a line and connected to a source of pressurized water, not shown, is connected to the bottoms of inclined grooves 33a. An annular space 37 having substantially triangular cross-section is formed above water whirling ring 33 between upper and lower members 34 and 32 which are threaded together. A thin inclined annular shaped ejecting nozzle 38 is communicated with the lower end of the annular space 37, the inner periphery of nozzle 38 opening concentrically with and on the lower outer side of outer nozzle 20. The conical portion 34a of upper member 34 is provided with a plurality of small vertical air supply perforations 39 communicating with nozzle 38. The lower end of pipe 35 is connected to a spray pipe 41 and the water ejecting head 43 of the stirring mechanism 42 is mounted in the lower portion of pipe 41. At the center of the water ejecting head 43 there is provided an orifice 44 formed between upper and lower conical surfaces 45a and 45b and an annular groove 46 is formed on the outer surface of the water ejecting head. The annular groove 46 in communicated with a source of pressurized water, not shown, through a pipe 67. A plurality of water ejecting passages 47a, 47b and 47c each communicating with annular groove 46 open at the orifice 44 and conical surfaces 45a and 45b respectively, passage 47a to the orifice 44 being horizontal while passages to inclined surfaces 45a and 45b inclining 45° upwardly and downwardly with respect to the horizontal. A perforated disc or screen 49 is secured to the lower end of spray pipe 41 by means of a conical flange 48. A conical projection 50 is secured on the perforated disc 49 which is provided with a plurality of small perforations. At exit pipe 52 of small diameter is connected to the lower end of conical flange 48.

In the operation of the dissolving apparatus thus far described, a powder which is relatively difficult to dissolve in water, such as the coagulating agent described above is charged into hopper 4, motor 10 is operated and compressed air is supplied into the first and second air passages 21 and 22. Operation of motor 11 rotates hollow shaft 12 to drive stirrer fan 13, rotary perforated disc 15, inner nozzle 16 and stirrer fan 17 secured thereto. The compressed air supplied to the first air passage 21 is ejected through the nozzle opening 16a of the inner nozzle 16 and through air ejecting openings 22 and 23. The air ejected through air ejecting openings 22 and 23 functions to flow upwardly the powder supplied into metering chamber 8 from supply hopper 4 to maintain the powder in the metering chamber 8 at a definite density which is aided by the stirring action provided by stirrer fan 17. The air-powder mixture in the metering chamber 8 is discharged therefrom through discharge passage 19 at a constant rate by the suction of the air stream ejecting from the inner nozzle opening 16a. Then the stream of air-powder mixture is supplied into the outer nozzle opening 20 where it is admixed with the compressed air supplied by the second air passage 25, and the resulting mixture is ejected downwardly. The quantity of the powder ejected can be controlled by adjusting the air pressure supplied to the first air passage 21. The air ejected through openings 22 and 23 is conveyed to discharge 19 via the third air passage 26 so as to decrease the supply of the powder to the metering chamber 8 from hopper 4 through annular passage 9 where the density of the powder in the metering chamber 8 is high. Further, lumps of the powder are pulverized by the rotation of stirrer fan 13 and rotary perforated disc 15 and the pulverized powder is fed downwardly through stationary perforated disc 14.

Pressurized water is supplied to spray mechanism 31 through pipe 36 and the water is conveyed to annular space 37 through inclined grooves 33a of water whirling ring 33. Thus, the water is admitted into space 37 while whirling and is then ejected through the annular passage 38 to act upon the stream of air-powder mixture discharged from nozzle 20. As air is supplied through perforations 39 to the pressurized water ejected from annular passage 38, the water is sprayed and since whirling motion is already imparted thereto by the whirling ring 33 the water is brought into intimate contact with the powder and adheres or surround the same. Thus, a spray of a mixture of air, water and powder is fed downwardly through pipe 35 and spray pipe 41. Pressurized water is also ejected through passages 47a, 47b and 47c extending through water ejecting head 43 of the stirrer mechanism 42. The water ejected through passages 47a is supplied to nozzle 44 and the water ejected through passages 47b is ejected above nozzle 44 toward the center of the mixture 50 as is oppose the downward movement of the stream of mixture, thus causing a portion thereof to flow upwardly or in a counterflow fashion. For this reason, the mixture is agitated vigorously for an interval during which the water ejected from passages 47a and 47b is thoroughly admixed with the powder coated by water whereby a water column containing uniformly dispersed air bubbles and the powder is discharged downwardly through the orifice 44. The water column is accelerated by the pressurized water ejected downwardly through passages 47c to impact against perforated disc 49. While passing through small perforations 51 of the disc 49, the water column is further squeezed or subdivided into five streams. The powder which has been rendered more dissoluble by being contacted by water spray and stirred by the stirrer fan 42 will be subjected to an additional viborous mixing action by the collision against perforated disc 49 and by the passage through small perforations 51, whereby the powder will be completely dissolved in water and the aqueous solution is discharged through pipe 52. The solution can be added to industrial waste water, for example, directly or after stored in a dissolving tank.

When supply of the compressed air to the first air passage 21, supply of the pressurized water to the dissolving apparatus and supply of electric power to motor 10 are interrupted and when valve 27 is closed supply of the powder and contact thereof with water are also terminated continued supply of the pressurized air to the second air passage 25 prevents deposition of wet powder on the inner wall of the outer nozzle 20. Then, the supply of the pressurized air to the second passage 25 is terminated. Electric header 29 is then energized to dry the upper and lower portions 18a and 18b of outer nozzle 18 thus preventing the deposition of the powder upon these portions.

As described above, according to the apparatus of this invention, a predetermined small quantity of the powder is successively admixed with and conveyed by air and pressurized water is ejected against the air-powder mixture to form a mist containing the powder in contact with water. Since the mixture contains only a small quantity of water and consists of air, powder and small particles of water, when a large quantity of water is ejected upon the column shaped mixture, the degree of dissolution of the powder into water can be increased greatly by the uniform dispersion and contact of the powder with water which is to be compared with the prior apparatus wherein a large quantity of water is ejected in the form of laminae or columns so as to contact with the powder. In the latter apparatus, the powder aggregated and maldistributes in water so that uniform mixing and dissolution are impossible. Further, the water is not merely added to the mist like mixture but instead, a portion of the mist like mixture is caused to flow in the opposite direction by the water ejected under pressure so that the powder is uniformly dispersed in water and the mixture is vigorously agitated thus effecting uniform and rapid dissolution of the powder.

Although the invention has been shown and described in terms of a preferred embodiment thereof, it should be understood that the invention is not limited to this particular embodiment and that many changes and modifications will be obvious to one skilled in the art without departing from the true spirit and scope of the invention as defined in the appended claims.

What is claimed is:

1. An apparatus for dissolving powder in water comprising a hopper adapted to contain said powder, a metering chamber communicated with the bottom of said hopper through a passage to receive the powder, a rotary air pipe extending through said hopper into said metering chamber, an inner nozzle connected to the lower end of said rotary air pipe in said metering chamber to eject a stream of pressurized air, a stirrer mounted on said inner nozzle for uniformly admixing said powder with said stream of pressurized air, an outer nozzle coaxial with said inner nozzle and connected therewith through a discharge passage for ejecting a stream of air-powder mixture, and a water spray mechanism for ejecting whirling water jet against said stream of air-powder mixture whereby to form a stream of mist like mixture containing air bubbles and the powder in contact with water.

2. The apparatus according to claim 1 wherein in said metering chamber, there are provided a stationary perforated disc and a rotary perforated disc secured to said rotary air pipe above said stirrer, said stationary and rotary perforated discs cooperating to pulverize lumps of said powder.

3. The apparatus according to claim 1 wherein the bottom of said hopper takes the form of an inverted cone and a second stirrer is secured to said rotary air pipe to cooperate with said inverted cone shaped bottom with a small gap therebetween.

4. The apparatus according to claim 1 which further comprises a first air passage for supplying air under pressure to said inner nozzle through said rotary air pipe, a second air passage for supplying air under pressure to said outer nozzle, and a third air passage extending between the upper portion of said metering chamber and said discharge passage.

5. The apparatus according to claim 4 wherein each of said second and third air passages is provided with an adjusting valve.

6. The apparatus according to claim 1 wherein said rotary air pipe is provided with at least one air ejecting opening opened in said metering chamber above said stirrer for admixing the powder with the air in said metering chamber.

7. The apparatus according to claim 1 wherein said water spray mechanism comprises an annular member having a vertical annular groove, a water whirling ring in said annular groove, said water whirling ring being provided with means for imparting whirling motion to water supplied under pressure into said annular groove, an upper member covering said annular member for forming an annular ejecting nozzle therebetween whereby whirling water is ejected through said annular ejecting nozzle upon said stream of air-powder mixture.

8. The apparatus according to claim 7 wherein said upper member is provided with a plurality of perforations for supplying air to said whirling water.

9. The apparatus according to claim 1 which further includes a water stirring mechanism connected to the output of said water spray mechanism for sirring the air-powder-water mixture formed by said water spray mechanism, said water stirring mechanism comprising a pipe, a water ejecting head contained in said pipe, said water head including upper and lower conical surfaces, an orifice at the center of said head between said upper and lower conical surfaces, an annular on the outer surface of said head, horizontal passages between said orifice and said annular groove, upwardly inclined passages extending between said upper conical surface and said annular groove and downwardly inclined passages extending between said lower conical surface and said annular groove, and means for supplying water under pressure to said annular groove whereby the water ejected through said upwardly inclined passages causes a portion of said air-powder-water mixture to flow in the opposite direction whereas the water ejected through said downwardly inclined passages accelerates said air-powder-water mixture.

10. The apparatus according to claim 9 wherein a perforated disc is provided below said orifice and said lower conical surface.

11. The apparatus according to claim 10 wherein a conical projection is mounted on said perforated disc on the side thereof facing said orifice.

* * * * *